US005627827A

United States Patent [19]
Dale et al.

[11] Patent Number: 5,627,827
[45] Date of Patent: May 6, 1997

[54] AUTOMATIC SERVICE CUTOVER FOR ISDN PRIVATE EXCHANGE

[75] Inventors: Allan D. Dale, Haslett; Earl Goodrich, II, East Lansing, both of Mich.

[73] Assignee: Omnilink Corporation, Lansing, Mich.

[21] Appl. No.: 234,548

[22] Filed: Apr. 28, 1994

Related U.S. Application Data

[63] Continuation-in-part of Ser. No. 192,177, Feb. 4, 1994.

[51] Int. Cl.$^6$ .............................. H04J 3/12; H04M 1/00
[52] U.S. Cl. ..................... 370/359; 370/384; 379/94; 379/231; 379/377
[58] Field of Search ............................ 370/16, 53, 58.1, 370/58.2, 79, 110.1, 60.1; 379/93, 94, 96, 279, 231, 234, 352, 373, 375, 377, 382, 386

[56] References Cited

U.S. PATENT DOCUMENTS

| | | | |
|---|---|---|---|
| 4,551,581 | 11/1985 | Doughty | 379/94 |
| 4,575,584 | 3/1986 | Smith et al. | 379/279 |
| 4,652,701 | 3/1987 | Cubbison, Jr. | 379/373 |
| 4,709,388 | 11/1987 | Defretin | 379/413 |
| 4,737,986 | 4/1988 | Tsunoda | 379/373 |
| 4,805,213 | 2/1989 | Schlanger | 379/373 |
| 4,839,920 | 6/1989 | Held-Elbert et al. | 379/377 |
| 4,853,949 | 8/1989 | Schorr et al. | 379/94 |
| 4,868,873 | 9/1989 | Kamil | 379/386 |
| 4,979,171 | 12/1990 | Ashley | 370/110.2 |
| 4,998,243 | 3/1991 | Kao | 370/62 |
| 5,023,868 | 6/1991 | Davidson et al. | 370/62 |
| 5,034,948 | 7/1991 | Mizutani et al. | 370/79 |
| 5,054,055 | 10/1991 | Hanle et al. | 379/142 |
| 5,067,125 | 11/1991 | Tsuchida | 370/79 |
| 5,113,396 | 5/1992 | Kagami | 370/110.2 |
| 5,142,528 | 8/1992 | Kobayashi et al. | 370/79 |
| 5,142,571 | 8/1992 | Suzuki et al. | 379/279 |
| 5,193,110 | 3/1993 | Jones et al. | 379/94 |

FOREIGN PATENT DOCUMENTS

| | | |
|---|---|---|
| 9209164 | 5/1992 | WIPO. |
| 9312594 | 6/1993 | WIPO. |

OTHER PUBLICATIONS

"A Catalog of National ISDN Solutions for Selected NIUF Applications," Second Edition, Contributed by NIUF Applications Analysis Working Group, Oct. 19, 1993.

*Primary Examiner*—Hassan Kizou
*Attorney, Agent, or Firm*—Van Dyke, Gardner, Linn & Burkhart, LLP

[57] ABSTRACT

A private exchange includes a changeover control in order to control existing POTS customer premises equipment access redefinition in a changeover to an ISDN basic rate interface. The exchange includes a first port for connection to a local exchange, a second port for connection to a conventional analog subscriber station, and a controller which is connected with the first and second ports. The controller includes a digital network communication circuit and a cutover device for bypassing the digital network communication circuit in order to directly connect the first and second ports. The controller further includes a detector for activating the cutover device to bypass the digital network communication circuit in response to the first port being connected to a plain old telephone service and for deactivating the cutover device to connect the first port to the second port through the digital network communication circuit when the detector determines that the first port is connected to a digital exchange.

10 Claims, 5 Drawing Sheets

| STATE / EVENT | P0 – RESET STATE<br>NO TIMERS<br>PULSE COUNT = 0<br>ANALOGMODE = X | P1 – COUNT ISDN PULSES FOR TEST MODES<br>TIMER "A" RUNNING<br>PULSECOUNT >=1<br>NOT ANALOGMODE |
|---|---|---|
| OFF HOOK INTERRUPT FROM LINE 1 | (IF IN ANALOGMODE)<br>*ENABLE ANALOG CUT-OVER RELAY<br>*RECORD TIME<br>*START TIMER "B"<br>*U-PULSE INTERRUPT BECOMES HOOK INTERRUPT     P3 | / |
| TIMER "A" EXPIRATION | * | ELAPSE < ("A" – 20MS):<br>*RESTART "A" FROM RECORDED TIME     P1<br>ELAPSE >= ("A" – 20MS):<br>*SEND PULSECOUNT TO NT1 ACTIVATION STATE MACHINE     P0 |
| TIMER "B" EXPIRATION | / | / |
| U-PULSE INTERRUPT | NOT ANALOGMODE:     P1<br>ANALOGMODE:     P2<br>IN EITHER CASE:<br>*RECORD TIME<br>*PULSECOUNT = 1<br>*START TIMER "A" | TIME <122MS OR TIME >263MS:     P0<br>*CANCEL TIMER "A"<br>112MS <= TIME <=263MS:     P1<br>*RECORD TIME<br>*INCREMENT PULSECOUNT |

RESET COMMAND FROM NT1 ACTIVATION STATE MACHINE — *CANCEL TIMER "A"     P0
TIMER A – 500MS QUIET MODE TEST AND INSERTION LOSS MEASUREMENT TEST STOP INTERVAL
TIMER B – 15S (WHEN IN P3) – WAIT THIS TIME SINCE THE LAST U-PULSE INTERRUPT TO READ HOOK STATE

| P2 – COUNT ANALOG PULSES FOR RING DETECTION | P3 – WAIT TIMER "B" SINCE LAST PULSE, CHECK HOOK STATE | |
|---|---|---|
| TIMER "A" RUNNING<br>1 <= PULSE COUNT <=6<br>ANALOGMODE | TIMER "B" RUNNING<br>PULSECOUNT = X<br>ANALOGMODE | |
| P3<br>*ENABLE ANALOG CUT-OVER RELAY<br>*RECORD TIME<br>*CANCEL TIMER "A"<br>*START TIMER "B"<br>*U-PULSE INTERRUPT BECOMES HOOK INTERRUPT | / | |
| P0<br>(INVALID RING FREQUENCY) | * | |
| / | ELAPSE < ("B" – 20MS):<br>*RESTART "B" FROM RECORDED TIME<br>ELAPSE >= ("B" – 20MS); P3<br>READ OFF-HOOK THRU U-PULSE INTERRUPT: P3<br>*RECORD TIME<br>*START TIMER "B"<br>ELAPSE >= ("B" – 20MS),<br>READ ON-HOOK THRU U-PULSE INTERRUPT: P0<br>*DISABLE ANALOG CUT-OVER RELAY<br>*HOOK INTERRUPTS COME FROM LINE 1 | |
| TIME <12MS OR TIME >63MS: P0<br>*CANCEL TIMER "A"<br>12MS <= TIME <=63MS,<br>PULSECOUNT <6: P2<br>*RECORD TIME<br>*INCREMENT PULSECOUNT<br>12MS <= TIME <=63MS,<br>PULSECOUNT >=6: P3<br>*ENABLE ANALOG CUT-OVER RELAY<br>*RECORD TIME<br>*CANCEL TIMER "A"<br>*START TIMER "B"<br>*U-PULSE INTERRUPT BECOMES HOOK INTERRUPT | P3<br>(U-PULSE INTERRUPTS ARE NOW HOOK INTERRUPTS)<br>*RECORD TIME | |
| / | / | |

"_" – NO CHANGE, NO ACTION

"/" – IMPOSSIBLE OR PROHIBITED SITUATION

"*" – TECHNICALLY A "/" BUT IMPLEMENTED AS A "_"

"X" – DON'T CARE

FIG. 4B

AUTOMATIC SERVICE CUTOVER FOR ISDN PRIVATE EXCHANGE

CROSS-REFERENCE TO RELATED APPLICATION

This application is a continuation-in-part of patent application Ser. No. 08/192,177, filed Feb. 4, 1994, entitled PRIVATE EXCHANGE FOR ISDN.

BACKGROUND OF THE INVENTION

The present invention pertains to private exchanges and, more particularly, to a basic rate private exchange for interfacing between a digital network local exchange such as the Integrated Services Digital Network (ISDN) and a wide variety of different types of subscriber station devices. More particularly, it pertains to a mechanism to arrange for automatic cutover, or changeover, from older, analog Plain Old Telephone Service (POTS) to the more advanced ISDN basic rate service.

The Integrated Services Digital Network is :a world-wide telephone industry standard for the delivery of digital telephony services. In its Basic Rate Interface (BRI) implementation, ISDN can utilize most existing two-wire local exchange loops. In North America, the ISDN basic rate interface provides full duplex, 160,000-bit per second service through an encoding and signaling technique known as 2B1Q. Either 2B1Q or other similar encoding techniques are used outside of North America. CCITT ISDN specifications have defined several interface reference points in the ISDN.. The customer end of the two wire local exchange loop is known as the "U" reference point which connects to a network local exchange LE. At the U reference point, the 160,000-bit per second bandwidth is subdivided into one 16,000-bit per second signaling and packet data D channel, two 64,000-bit per second bearer B channels and one 16,000-bit per second maintenance M channel. According to CCITT specifications, the U reference interface must be terminated by a device known as a Network Termination-1 (NT-1). The NT-1 processes the information in maintenance channel M and converts the two-wire full duplex interface into a four-wire duplex interface including two two-wire simplex interfaces. The four-wire downstream interface provided by the NT-1 is known as the "S/T" reference point. According to the CCITT reference model for ISDN, all ISDN Customer Premises Equipment connects at the S/T reference point. In an improved private exchange, a single device will accept the "U" input and synthesize an analog phone connection, with necessary translation from the standard analog service to the more complex ISDN interface.

Signaling activity, performing the functions of call setup, call progress and data link establishment, for BRI of the ISDN is performed by a complex protocol of information packet exchanges across the signaling channel D between the local exchange and the customer premises equipment. This signaling activity is sufficiently complex to require the services of a powerful microcomputer and a large,. complex set of software instructions contained within the customer premises equipment.

A difficulty encountered in marketing a digital network private exchange is that the ISDN U and S/T reference interface points are functionally incompatible with the existing analog POTS. None of the existing POTS customer premises equipment, such as telephones, answering machines, PBXs facsimile devices and modems can operate if they are attached directly to either the U or the S/T ISDN reference points. In the CCITT ISDN reference model, the primary method for telephony users to connect to an ISDN basic rate interface is through entirely new digital S/T reference interface customer premises equipment. Due to many factors, such as the complexity of ISDN basic rate interface signaling protocols, the digital S/T reference interface; customer premises equipment has proven to be very expensive, often on the order of ten times the cost of POTS customer premises equipment. Additionally, in North America the ISDN user is responsible for the cost of supplying and installing the ISDN basic rate interface NT-1 device, and providing main power and power backup devices necessary to supply reliable DC power to the attached S/T reference interface customer premises equipment.

Over the past several years, Unites States telephone service suppliers have invested billions of dollars developing and deploying the central office switching equipment, software and human resources necessary to enable the; wide spread utilization of an ISDN basic network interface. However, user acceptance of this service has been very minimal. There is now a widely accepted belief that the primary barrier to widespread user acceptance of the ISDN basic rate interface is the high cost of ISDN equipment to the ISDN customer. This cost is compounded by the incompatibility of the: ISDN S/T reference interface with existing POTS customer premises equipment which prevents telephone users from utilizing their existing POTS customer premises equipment with an ISDN basic rate interface.

CURRENT ART

There now exists a large variety of telephone customer premises equipment designed to interface directly to the BRI ISDN at the S/T or U interface reference points. This ISDN customer premises equipment includes telephones, adapters for personal computers and various self-contained data interface units. Some of this customer premises equipment supports both data and voice operations, and others include support for analog POTS customer premises equipment. However, this existing customer premises equipment does not provide a sufficient degree of access integration for existing POTS and data customer premises equipment to ISDN basic rate interface, and they do not include adequate access functions required for such integration, More importantly, it is the burden of the customer to coordinate the changeover of an existing analog line (with all the phone devices attached thereto) into the newer digital service, for which his present phone devices are unsuitable.

SUMMARY OF THE INVENTION

The present invention provides a means to control existing POTS customer premises equipment access redefinition in a changeover to an ISDN basic rate interface. The described invention permits access to ISDN voice and data services without requiring a change in the existing POTS customer premises equipment and allows nearly continuous phone operations through automatic changeover. According to the invention, the private exchange device provided includes a detector for detecting whether the port connected to the local exchange is connected to an ISDN network or to a conventional network. If the system detects that it is connected to a conventional analog network, an ISDN control circuit used for communicating with the ISDN network is bypassed, and an analog telephone port is connected directly to the analog exchange.

According to another aspect of the invention, the ISDN private exchange apparatus detects the ISDN switch utilized by the local exchange and is further adapted to thereby automatically communicate with the local exchange according to the particular switch used at the local exchange.

The present invention provides a versatile, low cost, basic rate ISDN local exchange interface device which can be readily installed by a non-technical user in a residential or small business environment and provides extensive hardware functionality in a fully integrated package.

A private exchange according to the invention connects to the bare copper pair access point at the customer end of the subscriber loop, and performs the network interface functions required under CCITT standards. The private exchange provides a great deal of versatility in connecting POTS devices to an ISDN local exchange.

These and other objects, advantages, and features of this invention will become apparent upon review of the following specification in conjunction with the drawings.

BRIEF DESCRIPTION OF THE DRAWINGS

FIGS. 3 and 4 are state diagrams of a ring detection state machine.

DETAILED DESCRIPTION OF THE PREFERRED EMBODIMENTS

Figure 1:
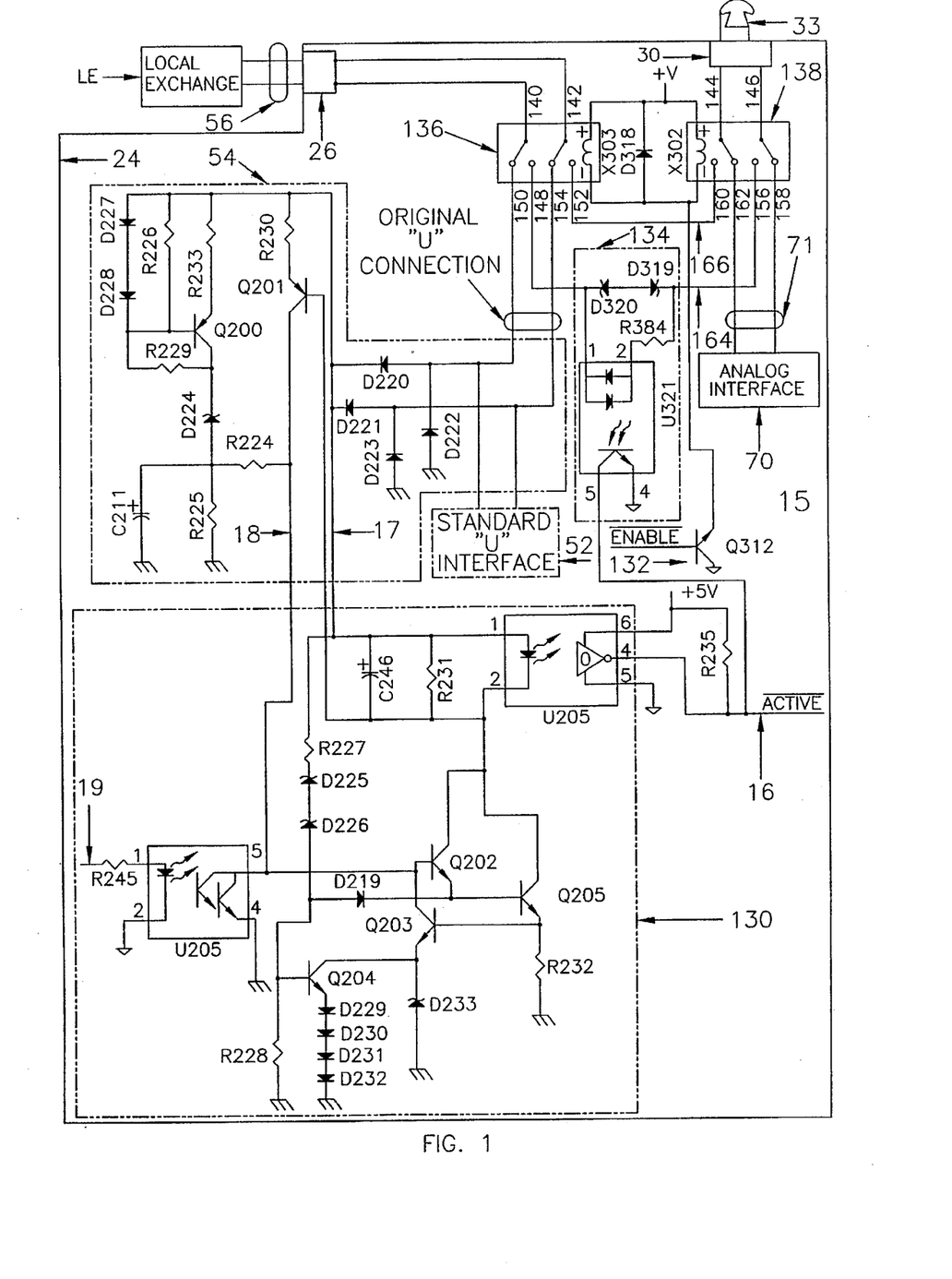
FIG. 1 is a combined circuit schematic and block diagram of an ISDN private exchange, with network for automatic detection and changeover logic, according to the invention.

Referring now specifically to the drawings, and the illustrative embodiments depicted therein, an ISDN private exchange 24 according to the invention is illustrated in FIG. 1. An example of a private exchange is described in co-pending commonly assigned International Patent Application No. WO 95/22218, entitled PRIVATE EXCHANGE FOR ISDN, published Sep. 14, 1995 the disclosure of which is incorporated herein by reference. In general, reference numerals are commonly used between the present application and said co-pending application. The private exchange includes a port 26 for connection to an ISDN local exchange LE at the "U" boundary. Although the preferred embodiment is illustrated with reference to an integrated services digital network, those skilled in the art will recognize that the invention may be advantageously utilized for communication with any intelligent connection to a digital line exchange which uses a digital carrier. For example, the private exchange may be connected to a digital cable service, a digital cellular phone service, or the like.

Somewhat more particularly, private exchange circuit 24 also includes at least one analog port 30 for connection to analog subscriber devices 33, such as POTS analog telephones, modems, or any other device which connects to a POTS central exchange. A U-port module 52 is connected to U-port 26 through a U-port interface. U-port module 52 and U-port interface are described in detail in previously referred to co-pending application No. WO 95/22218, which description will not be repeated herein. Suffice it to say, U-port interface circuit includes circuit components used to interface between a two-wire pair 56 connected to the local exchange LE and the "U" port module 52. The interface typically includes transformers, protection devices, switches, and sealing current circuits, as fully disclosed in said co-pending application. Analog port 30 is connected to a subscriber line analog interface, or similar circuit 70, through wires 71. Analog interface 70 is described in detail in co-pending, commonly assigned International Patent Application No. WO 95/21498 published Aug. 10, 1995 by Earl R. Goodrich II and Thomas R. Bayerl for PRIVATE EXCHANGE POTS LINE INTERFACES, the disclosure of which is hereby incorporated by reference.

Private exchange 24 further includes a :private exchange circuit bypass, generally designated at 15, which connects analog port 30 directly to U-port 26 when the local exchange is a plain old telephone service exchange (POTS). Private exchange circuit bypass 15 includes a sensor 130 connected to port 26, which in turn is connected to the local exchange LE. Sensor 130 detects a ringing voltage signal on the two-wire pair 56. A ringing voltage signal is present only if the local exchange is a POTS exchange. In the preferred embodiment, modifications are made herein to the 'U' interface sealing current circuit 54, disclosed in the previously referred to application No. WO 95/22218, to make a more cost-effective ringing signal detector. These modifications will now be described. An optocoupler U205 generates an output signal over an active line 16 to a main microprocessor (not shown) when a current is present on the local exchange two-wire pair 56, and is being passed by a sealing current transistor Q205 in conjunction with a transistor Q202. Optocoupler U205 is preferably implemented using commonly available MOC5008 or H111L1 integrated circuits which create input hysteresis. Input hysteresis reduces noise and prevents chattering on the slow edges of the current waveform on the two-wire pair 56. A zener diode pair D225 and D226 are provided to limit the reference voltage for transistor Q203, which functions as a current sink control to reduce the current in transistor Q205 when the DC voltage detected on a rectified voltage line 17 exceeds 60 volts. This current limitation normally reduces the heat dissipation of transistor Q205 when larger voltages are present on pair 56. In the preferred modification, 'normal' sealing current operation is selectively disabled by an optocoupler U206 whose output is connected with a line 18, which is capable of disabling the normal current sources for sealing current startup. Optocoupler U206 is driven from a 'SealKill' line 19. This is necessary because the 'battery' voltage present on a standard analog line is above the normal 'sealing current' trigger threshold, and triggering the sealing current logic on a analog line has the same affect as a normal phone off-hook, which would keep the analog phone line 'busy.'

Also, the 'off-hook' interrupts from the service port 26 are re-directed through this logic to enable a changeover operation. The 60 v detector voltage on line 17, instead of activating a current-rollback, will activate the current sink transistor Q205 directly through a diode D219. This allows the microprocessor input to detect ringing-signal voltages present on the input wire pair 56. The ringing AC voltage will be rectified and appears as 0 to 120 v (nominal) haversines (full-wave rectified sine waves) across this circuit, so the microprocessor will see pulsing on its input line at the ringing frequency, or at twice the frequency depending on the DC bias voltage. A control program 200 (see FIG. 2) can discriminate this pulse rate as a ringing signal, and initiate the analog changeover to allow the direct connection to the analog line for completely normal phone functionality.

To enable the analog shunt connection, program 200 drives a control bit from an output of the main microprocessor (not shown) which is connected to the base of transistor switch 132. The transistor drives the coils of relays 136, 138 from a voltage supply +v. The coil of relay 136 is coupled to switches 140 and 142. The coil of relay 138 is connected switches 144 and 146. When sensor 130 detects that POTS exchange ringing is present, switch 132 is turned on, allowing the current to flow through coils 136 and 138. These coils cause switches 140, 142, 144 and 146 to connect the pins of port 26 to contacts 148 and 152 and the pins of port 30 to contacts 156 and 160. Contacts 148 and 156 are indirectly connected by conductor 164 and contacts 152 and 160 are directly connected by conductor 166. Port 26 is thus connected directly to port 30.

A line current detector 134 is inserted in conductor 164 to monitor analog phone use through private exchange circuit bypass 20. Line current detector 134 consists of an optocoupler U321, preferably implemented with an H1AA1 type IC with bi-directional LED input for sensing current in either direction. Current through optocoupler U321 is limited by the back-to-back zener diodes D319/D320 in parallel with a resistor R384. Line current detector 134 will be responsive to any significant current in line 164, including AC currents from ringing signals, and DC currents from an off-hook condition of POTS phone 33. This allows the microprocessor to monitor any ringing or off-hook activity during this changeover connection from a POTS service to an ISDN service, and maintain that connection as long as necessary without any impact on the user functionality. The output of optocoupler U321 can be connected to the same status line to the microprocessor system as the ringing detector, since the operation of the two detectors are mutually exclusive. A 20-second delay is inserted between the last analog line activity and the actual release of the crossover connection to minimize unnecessary switching (see FIG. 2).

Additionally, if a user on port 30 goes "off-hook" and the private exchange has not yet established a valid digital connection, relays 136 and 138 will be activated by program 200, through switch 132, to put the analog phone straight through to the local exchange LE. When the user hangs up at port 30 as detected by loss of fine current through detector 134, switches 140, 142 are connected to contacts 150, 154 and switches 144, 146 are connected to contacts 158 and 162. The analog port 30 is thus connected through the private exchange circuit 24 and the private exchange circuit 24 is connected to the U-port 26.

This ability to switch between the direct connection of the analog port to the POTS exchange is a significant advantage because the user typically does not know the exact time that the service provider will switch over from a POTS interface to a ISDN local exchange LE. The circuit bypass of the present invention automatically detects the change from a POTS exchange to an LE exchange by the telephone company, and provides the appropriate connection which allows the analog telephone set connected to port 30 to operate for either exchange. An analog phone connected to port 30 may thus communicate over either interface independently of the user's knowledge of whether the private exchange or the ISDN exchange is currently connected to port 26.

Figure 2:
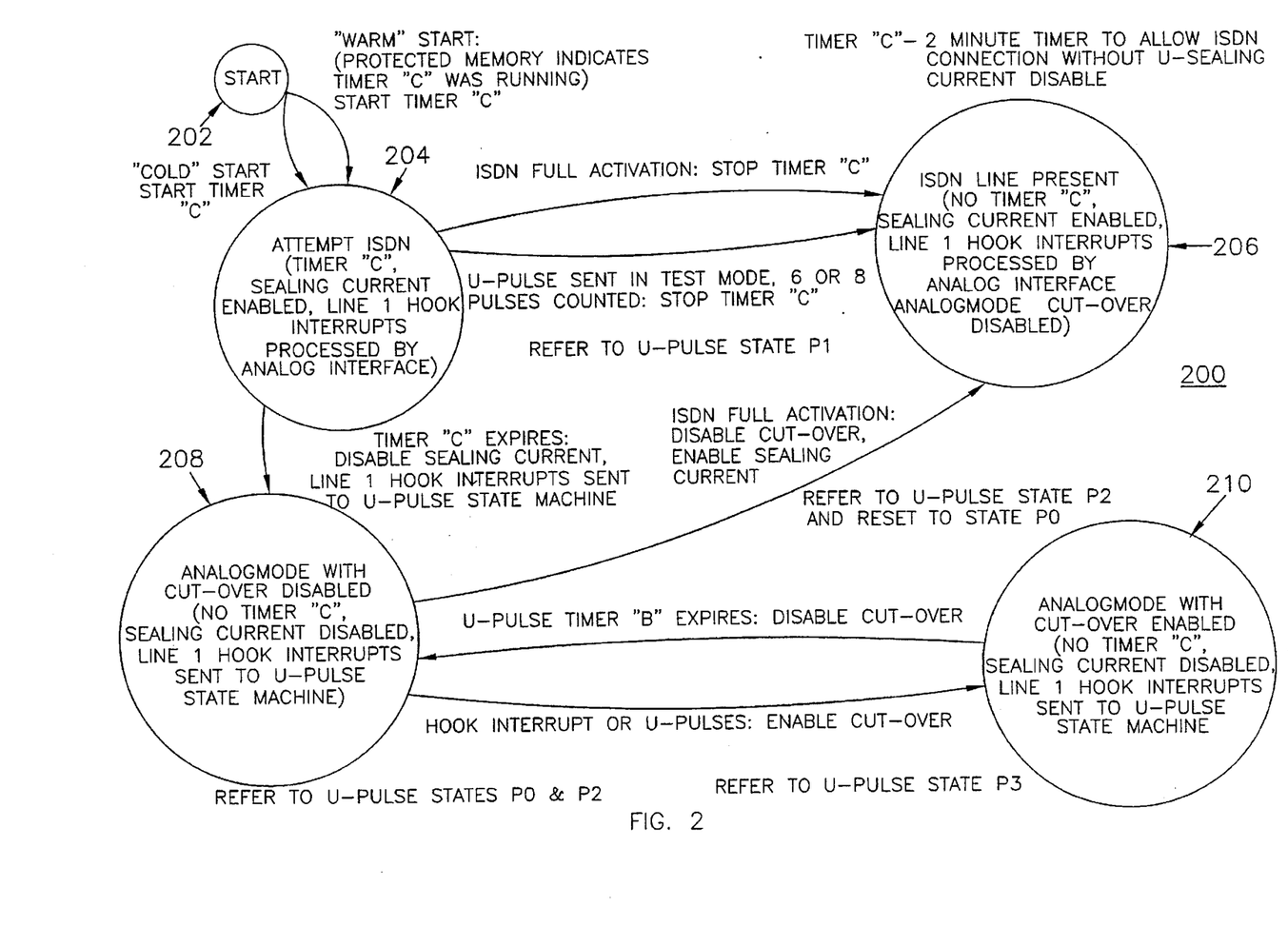
FIG. 2 is a state diagram of the changeover decision machine.
Figure 3:
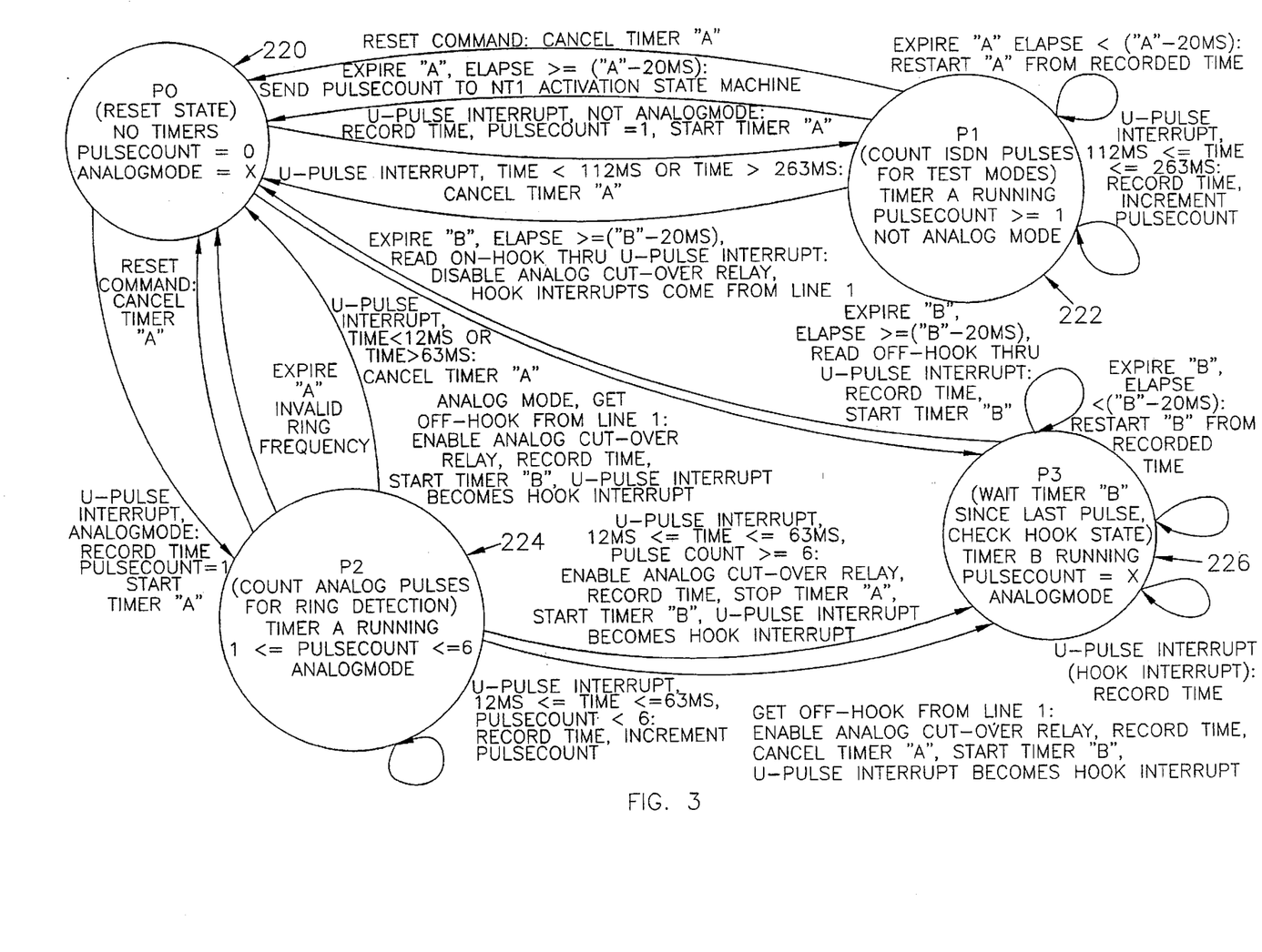
Figure 4A:
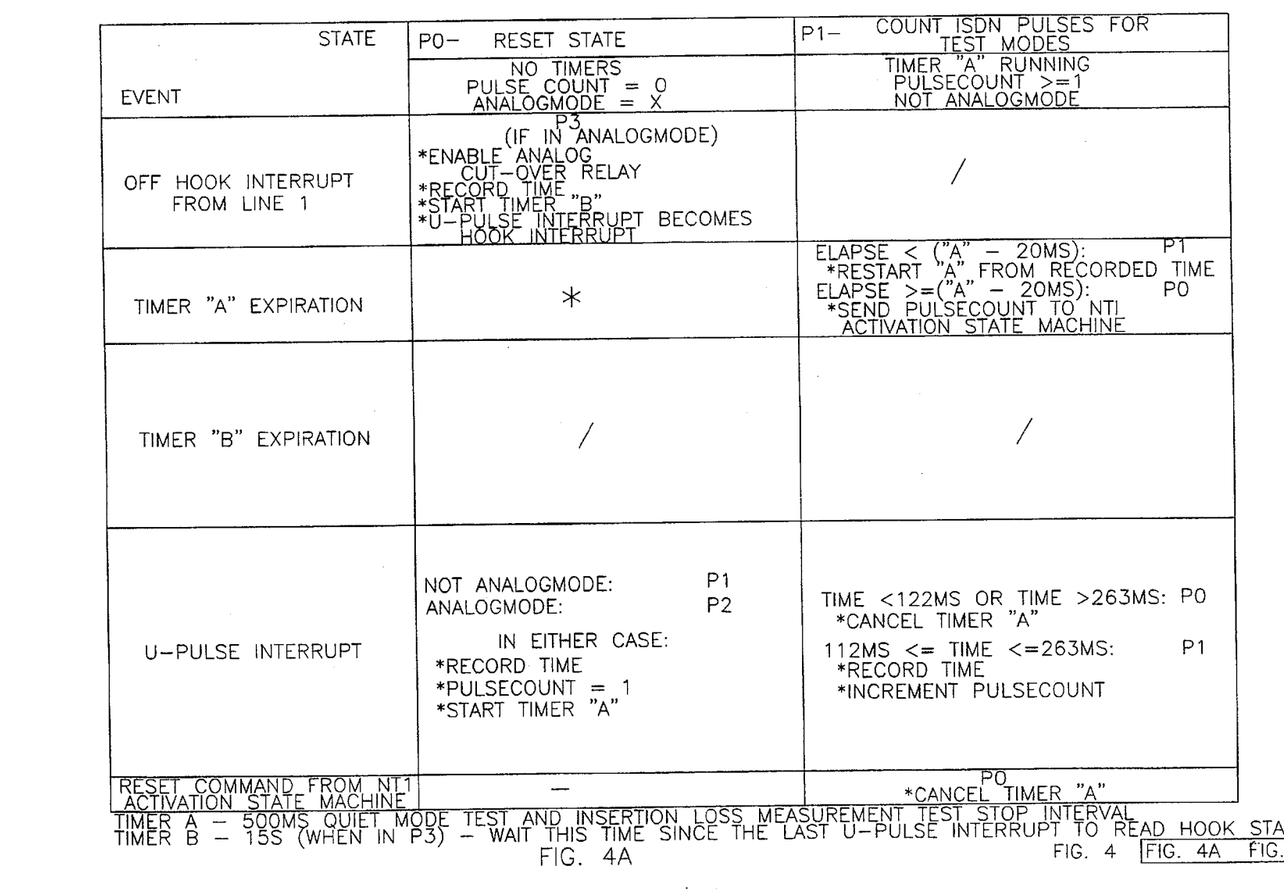
FIG. 4A is a first portion of the state diagram in FIG. 4.
Figure 4B:
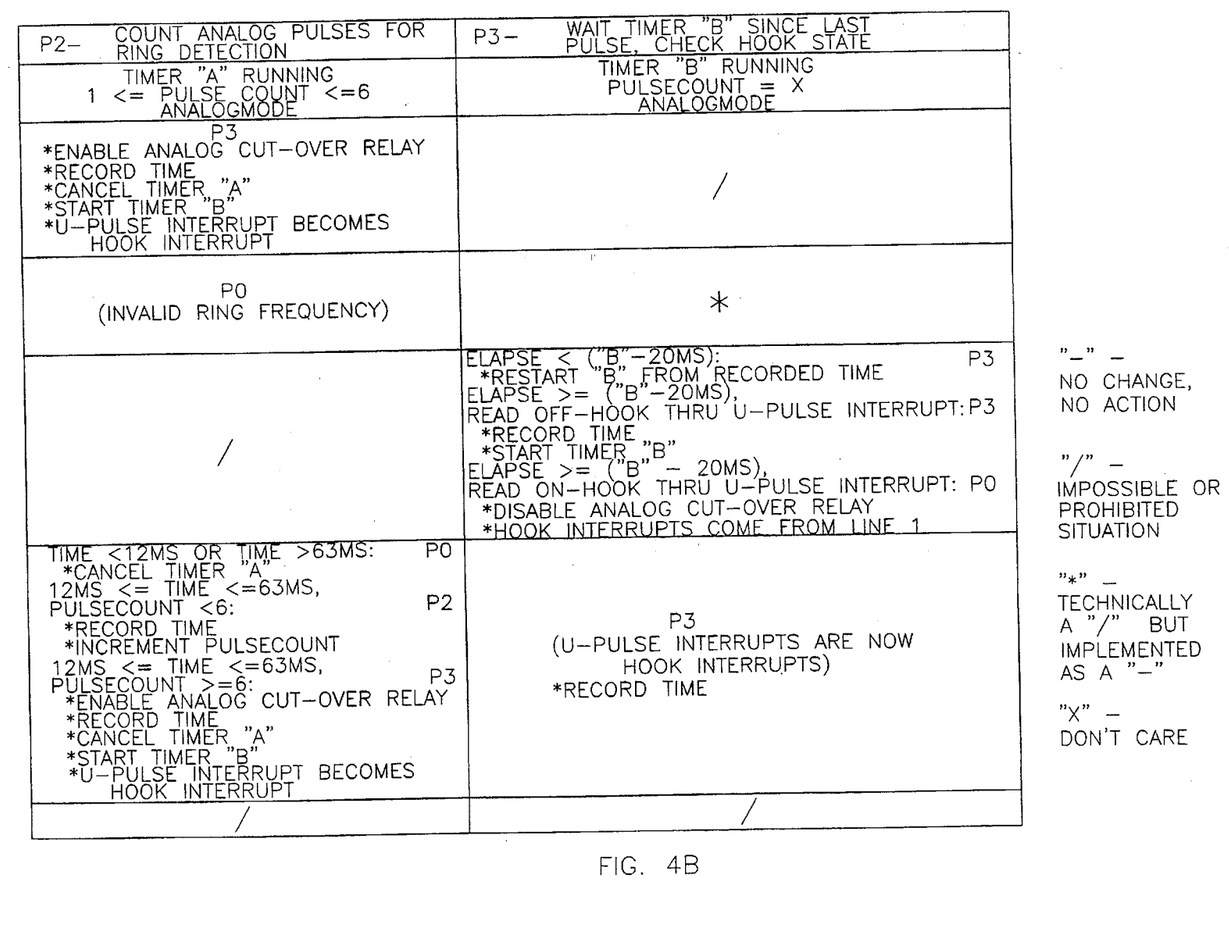
FIG. 4B is a second portion of the state diagram in FIG. 4.

The diagram of program 200 for making the cross-over activation decisions is detailed in FIG. 2. FIGS. 3 and 4 detail the underlying state machine which discriminates among the signal transitions on line 16. Referring to FIG. 2, the system starts from reset in 'start' state 202. At startup, a time (denoted 'Timer (C)' is allowed and it is assumed that a successful digital connection can be made. For this time, the automatic changeover capability is disabled and port 26 hook interrupts are processed by the normal analog support mechanisms. This disable is to prevent any changeover attempts from interfering with the initial digital connection attempts. In the preferred embodiment, this time is set at two minutes. An exit from start state 202 may be as a power-on 'cold' reset, or as a system restart. Only on a cold-start is 'Timer C' reset. In either case, a transition is made to an 'Attempt ISDN' state 204, where attempts are made to establish a digital connection. If digital activation is successful, or if special ISDN-only 'out-of-band' signaling known as Quiet-Mode-Pulsing is detected, a transition is made to an 'ISDN Line Present' state 206, where normal phone processing occurs until the next system restart.

If 'Timer C' expires in state 204 prior to successful digital connection, the analog changeover decisions are enabled by transitioning to an 'Analog Mode with Cut-Over Disable' state 208. In state 208, the system mode changes for analog cutover are made. Normal sealing current functions are disabled on wire pair 56 by asserting the 'SealKill' line as described herein above. If, at any time while 'idling' in state 208, digital connection is established, a transition is immediately made back to 'ISDN Line Present' state 206, thus disabling the changeover logic, re-enabling the sealing current functions, and returning the service port 26 hook interrupts to their normal processing.

While in the 'Analog Mode with Cut-over Disabled' state 208, if either port 26 goes off-hook, or program 200 detects ringing-tylx, signals, a transition is made to an 'Analog Mode with Cut-over Enabled' state 210, where the 'ENABLE' into transistor 132 (FIG. 1) is activated, connecting the devices on port 26 directly to the incoming wire pair 56. While in state 210, another timer is started, 'Timer B.' Timer B monitors line activity using the same 'ACTIVE' status line 16 used by the sealing current/ring detect logic. Timer B is set to 20 seconds in the preferred embodiment. This operation is further detailed as 'P3' state 226 in FIG. 3, where every time Timer B expires, the time since last status change and the hook status of port 26 are examined. If the line is now idle and has been idle for close to the limit measured by 'Timer B,' then the changeover is turned off to allow new attempts at digital connection. This is done by transitioning back to 'Analog Mode with Cut-over Disabled' state 208 and turning off the cut-over relay enable line.

Actual interrupt activity on the 'U' wire pair 56 is further detailed in FIG. 3. The same information is presented in tabular form as FIG. 4. Idle operation starts out in 'P0' state 220, waiting for an interrupt. A transition is made to a 'P1' state 222 on an interrupt, which occurs when program 200 (FIG. 2) is not in either 'Analog Mode with Cut-over . . . ' states 208 or 210. In state 222, the ISDN Quiet-Mode signaling is expected, not POTS pulse ringing. In P1 state 222, a short timer, 'Timer A,' discriminates incoming pulses to verify that they are in a valid 6–8 pulses per second range, and gives an end-of-pulsing event to record a total number of pulses. A transition is then made from P1 state 222 back to 'P0' state 220 (Idle) when: (a) the timer expires at the end of the pulses, (b) the pulse was too short or too long to be a valid signal, or (c) a 'U'-interface reset command is given by other software (not shown).

When in 'P0' state 220, in which analog changeover is allowed, pulses are counted in a 'P2' state 224 in the same manner as in 'P1' state 222, except that the presence of ring-frequency is being detected. If 6 pulses, in the illustrated embodiment, are obtained at a valid ring frequency, a transition is made to a 'P3' state 226, which is the same state as 'Analog Mode with Cut-over Enabled' state 210. In either 'P0' state 220 or 'P2' state 224, an off-hook event will cause a transition directly to 'P3' state 226 so that a phone connected with port 26 can directly dial onto the incoming line. 'Timer B' runs in 'P3' state 226 to monitor activity on the line, which is defined as edges seen as a result of ringing signals or normal on-hook/off-hook activity, and waits until the line has been idle for nearly the total 'Timer B' period.

This is accomplished without a lot of timer overhead by a Record Time feature, where the incoming interrupts are simply time-stamped relative to the last start of a timer. Then, when the timer does expire, the time-since-last interrupt is checked, and if sufficiently close to the total 'B' time (within 20 milliseconds in this case), then the time is considered expired. Otherwise, the timer is restarted to expire one whole period from the last event. If no other events come in, when that time: expires and if the line is now idle ('on-hook'), then it will have been idle for exactly one 'Timer B' period (again, nominally 20 seconds). At that time, a transition is made to 'P0' state 220 and the changeover relays are released to await the next operation. Upon the occurrence of invalid frequencies, or upon a software reset command, a transition is made from 'P2' state 224 back to 'P0' state 220 without changing the state of the changeover operation.

Accordingly, it can be seen that an improved private exchange as disclosed services all types of analog and digital exchanges for analog POTS devices. It is to be understood that the foregoing description of the preferred embodiments of the invention is provided for purposes of description and illustration, and not as a measure of the invention, whose scope is to be defined by reference to the ensuing claims. Thus, those skilled in the art may devise embodiments of the particular concepts presented in the foregoing illustrative disclosure which differ from the particular embodiments shown and described in detail herein or may make various changes and structural details to the illustrated embodiments. Accordingly, all such alternative or modified embodiments which utilize the underlying concepts of the invention and incorporate the spirit thereof are to be considered as within the scope of the claims appended herein below, unless such claims, by their language, specifically state otherwise.

The embodiments of the invention in which an exclusive property or privilege is claimed are defined as follows:

1. A private exchange comprising:
   a first port for connection to a local exchange through a telephone line;
   a second port for connection to an analog device;
   an exchange analog interface;
   a signal conductor;
   a first switch connected to said first port and selectively connected to one of said analog interface and said signal conductor;
   a second switch connected to said second port and selectively connected to one of said signal conductor and said analog interface;
   a detector for detecting whether said first port is connected to a digital local exchange or to an analog local exchange; and
   a selector for controlling said first and second switches to connect said second port to said first port through said signal conductor when said first port is connected to an analog local exchange and said selector controlling said switches to connect said first port and second port through said analog interface when said detector determines that said first port is connected to a digital local exchange.

2. The private exchange as defined in claim 1 wherein said detector determines that it is connected to an analog exchange by sensing the power level on the telephone line coupled to said first port.

3. A subscriber premises private exchange for communicating with a digital exchange, comprising:
   a first port for connection to a local exchange;
   a second port for connection to a conventional analog subscriber station:
   a circuit bypass connected with said first and second ports, said circuit bypass having a digital network communication circuit, a cut-over device for bypassing said digital network communication circuit and a detector for activating said cut-over device to bypass said digital network communication circuit in order to directly connect said first and second ports in response to said first port being connected to a plain old telephone service; and
   wherein said detector discriminates between a particular signal on a digital network local exchange line and a ringing signal on a plain old telephone service in order to activate said cut-over device.

4. The private exchange as defined in claim 3 wherein said circuit bypass includes a sealing current circuit and a disabling device for disabling said sealing current circuit, wherein said sealing current circuit responds to said particular signal on a digital network local exchange line by applying a sealing current to said second port and said disabling device disables said sealing current circuit when said cut-over device is activated.

5. The private exchange as defined in claim 3 wherein said detector responds to a difference in frequency between said particular signal and said ringing signal in order to discriminate between said particular signal and said ringing signal.

6. In a subscriber premises private exchange for communicating with local exchange which is one of a digital exchange and a plain old telephone service; said private exchange having a first port for connection to a local exchange, a second port for connection to a conventional analog subscriber station and a circuit bypass connected with said first and second ports; said circuit bypass having a digital network communication circuit, a cut-over device for bypassing said digital network communication circuit when activated in order to directly connect said first and second ports; a method of selectively activating said cut-over device, including the steps of:
   attempting to establish a digital connection with a local exchange connected with said first port by momentarily deactivating said cut-over device; and
   if a digital connection with said local exchange cannot be established within a predetermined period of time, monitoring said first port for a ringing signal used on plain old telephone service and said second port for an off-hook condition of a conventional analog subscriber station, and actuating said cut-over device for the duration of said off-hook condition in response to one of said ringing signal and said off-hook condition.

7. The method of claim 6 wherein said circuit bypass includes a sealing current generating circuit for supplying sealing currents to said second port and further including disabling said sealing current generating circuit if said digital connection with said line cannot be established within said predetermined period of time.

8. The method of claim 6 including monitoring current between said first and second ports during said actuating in order to determine a termination of said off-hook condition.

9. The method of claim 6 wherein said attempting to establish a digital connection includes monitoring said first port for quiet-mode-pulses having a repetition rate of between 6 and 8 hertz.

10. A subscriber premises exchange for communicating with a local exchange which is either a digital exchange or a plain old telephone service, comprising:

a first port for connection to a local exchange;

a second port for connection to a conventional analog subscription station;

a circuit bypass connected with said first and second ports and having a digital network communication circuit, a cut-over device for bypassing said digital network communication circuit and a detector for selectively activating said cut-over device to connect said first port to said second port through said digital network communication circuit when said detector determines that said first port is connected to a digital exchange and to bypass said digital network communication circuit in order to directly connect said first and second ports in response to said first port being connected to a plain old telephone service.

* * * * *